United States Patent
Maeda et al.

(10) Patent No.: US 11,995,125 B2
(45) Date of Patent: May 28, 2024

(54) AGENT DEVICE, AGENT SYSTEM, AND RECORDING MEDIUM

(71) Applicant: TOYOTA JIDOSHA KABUSHIKI KAISHA, Toyota (JP)

(72) Inventors: Eiichi Maeda, Itabashi-ku (JP); Chikage Kubo, Chofu (JP); Keiko Nakano, Kawasaki (JP); Hiroyuki Nishizawa, Itabashi-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 618 days.

(21) Appl. No.: 17/158,059

(22) Filed: Jan. 26, 2021

(65) Prior Publication Data

US 2021/0232635 A1 Jul. 29, 2021

(30) Foreign Application Priority Data

Jan. 29, 2020 (JP) .................................. 2020-013027

(51) Int. Cl.
| | | |
|---|---|---|
| *G10L 15/26* | (2006.01) | |
| *B60K 35/60* | (2024.01) | |
| *G06F 16/9032* | (2019.01) | |
| *G06F 40/35* | (2020.01) | |
| *B60K 35/10* | (2024.01) | |
| *B60K 35/26* | (2024.01) | |
| *B60K 35/28* | (2024.01) | |

(52) U.S. Cl.
CPC ........ *G06F 16/90332* (2019.01); *B60K 35/60* (2024.01); *G06F 40/35* (2020.01); *G10L 15/26* (2013.01); *B60K 35/10* (2024.01); *B60K 35/265* (2024.01); *B60K 35/28* (2024.01); *B60K 2360/148* (2024.01); *B60K 2360/164* (2024.01)

(58) Field of Classification Search
None
See application file for complete search history.

(56) References Cited

U.S. PATENT DOCUMENTS

| | | | | |
|---|---|---|---|---|
| 5,537,590 A | * | 7/1996 | Amado | G06F 16/24564 706/45 |
| 6,351,698 B1 | * | 2/2002 | Kubota | G01C 21/3608 704/E15.045 |
| 11,508,367 B2 | * | 11/2022 | Park | G10L 15/22 |
| 2001/0049688 A1 | * | 12/2001 | Fratkina | G06N 5/042 |
| 2008/0294423 A1 | * | 11/2008 | Castellani | G06F 16/3329 704/4 |
| 2013/0041921 A1 | * | 2/2013 | Cooper | G06F 16/367 707/E17.099 |

(Continued)

FOREIGN PATENT DOCUMENTS

| | | |
|---|---|---|
| CN | 104282305 A | 1/2015 |
| CN | 108346430 A | 7/2018 |

(Continued)

*Primary Examiner* — Neeraj Sharma
(74) *Attorney, Agent, or Firm* — Oblon, McClelland, Maier & Neustadt, L.L.P.

(57) ABSTRACT

An agent device that receives state information regarding a state of a vehicle from the vehicle, and receive a question from a user as question information; performs inference processing for the received question information and the received state information in order to infer an intent of the question; and acquires a response to the question based on the inferred intent.

11 Claims, 15 Drawing Sheets

(56) References Cited

U.S. PATENT DOCUMENTS

| | | | |
|---|---|---|---|
| 2013/0204811 A1* | 8/2013 | Morinaga | G06F 16/2453 |
| | | | 706/12 |
| 2015/0123818 A1* | 5/2015 | Sellschopp | G08G 1/096844 |
| | | | 340/932.2 |
| 2016/0078403 A1* | 3/2016 | Sethi | G06Q 10/0875 |
| | | | 705/26.81 |
| 2017/0161386 A1* | 6/2017 | Mitsui | G06Q 30/0203 |
| 2018/0211663 A1* | 7/2018 | Shin | G10L 15/1815 |
| 2020/0020331 A1* | 1/2020 | Kim | G10L 15/30 |
| 2020/0104966 A1* | 4/2020 | Cella | G06N 3/045 |
| 2020/0167390 A1 | 5/2020 | Nakano | |
| 2022/0005470 A1* | 1/2022 | Sugihara | H04R 1/406 |

FOREIGN PATENT DOCUMENTS

| | | |
|---|---|---|
| JP | 2001-141500 A | 5/2001 |
| JP | 2019-127192 A | 8/2019 |
| JP | 2019-128625 A | 8/2019 |
| JP | 2020-86203 A | 6/2020 |

* cited by examiner

AGENT DEVICE, AGENT SYSTEM, AND RECORDING MEDIUM

CROSS-REFERENCE TO RELATED APPLICATION

This application is based on and claims priority under 35 USC 119 from Japanese Patent Application No. 2020-013027 filed on Jan. 29, 2020, the disclosure of which is incorporated by reference herein.

BACKGROUND

Technical Field

The present disclosure relates to an agent device, an agent system, and a recording medium recording a program therein used to provide a response to a question asked by a user.

Related Art

Japanese Patent Application Laid-Open (JP-A) No. 2001-141500 discloses a vehicle agent processing device that provides information relevant to the operation of various onboard units.

In cases in which the vehicle agent processing device of JP-A No. 2001-141500 is applied to an agent used to search an owner's manual, there is still room for improvement in terms of improving the inference precision with which the intent of a question is inferred from contents of an utterance of a user asking the question.

SUMMARY

An aspect of the disclosure is an agent device that includes: a memory; and a processor coupled to the memory. The processor is configured to: receive state information regarding a state of a vehicle from the vehicle, and receive a question from a user as question information, perform inference processing for the received question information and the received state information in order to infer an intent of the question, and acquire a response to the question based on the inferred intent.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
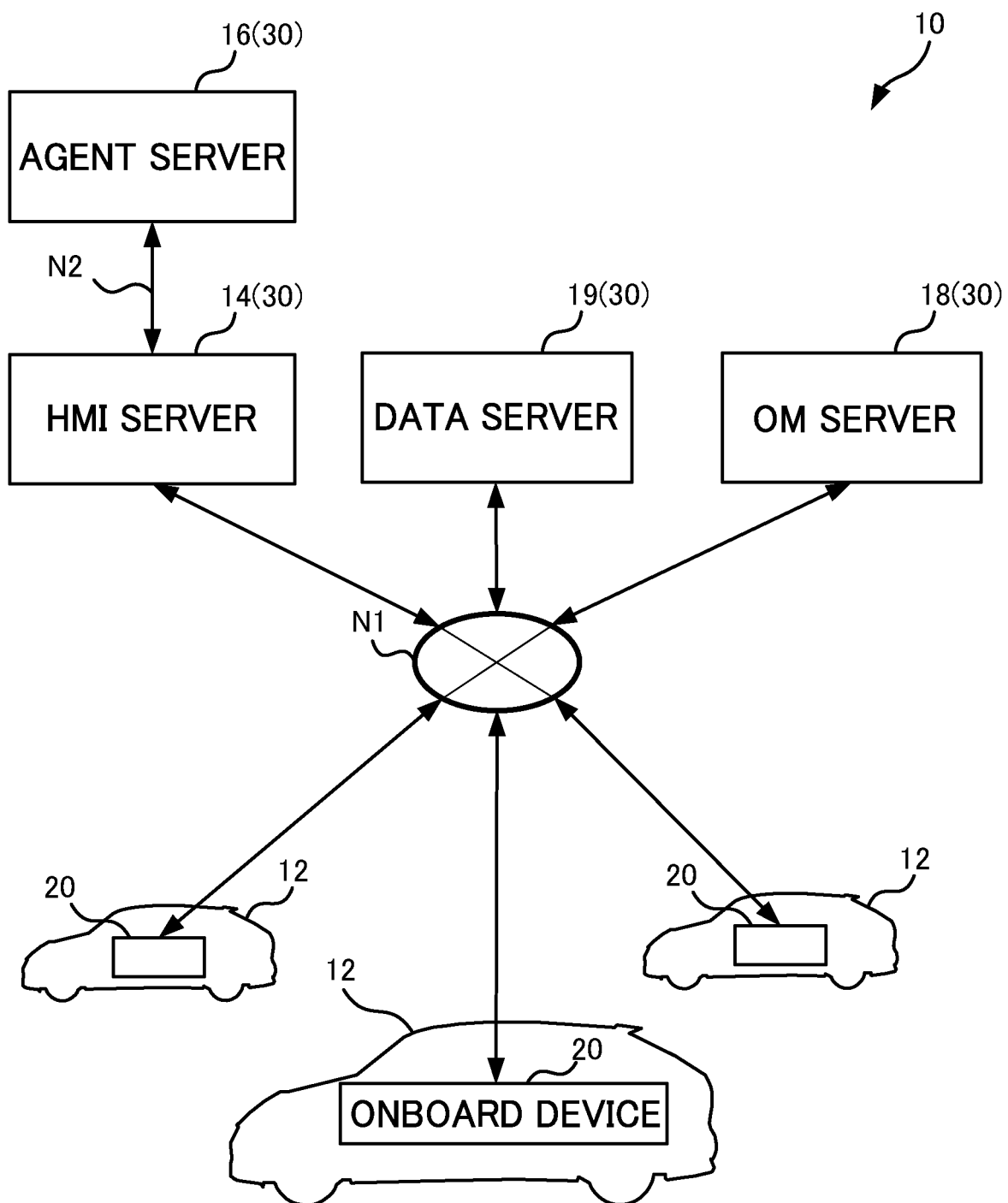
FIG. 1 is a diagram illustrating an example of schematic configuration of a manual provision system according to a first exemplary embodiment.

As illustrated in FIG. 1, a manual provision system 10 configuring an agent system of a first exemplary embodiment includes plural vehicles 12 and plural servers 30. An onboard device 20 serving as a notification device is installed in each of the vehicles 12. The servers 30 include a human machine interface (hereafter "HMI") server 14 serving as an interface device with an HMI function, an agent server 16 serving as an agent device, an owner's manual (hereafter also abbreviated to OM) server 18, and a data server 19.

The onboard devices 20 of the respective vehicles 12, the HMI server 14, the OM server 18, and the data server 19 are connected together through a network N1. The HMI server 14 and the agent server 16 are connected together through a network N2. Note that the agent server 16 may also be connected to the network N1, similarly to the other servers 30.

Vehicle

Figure 2:
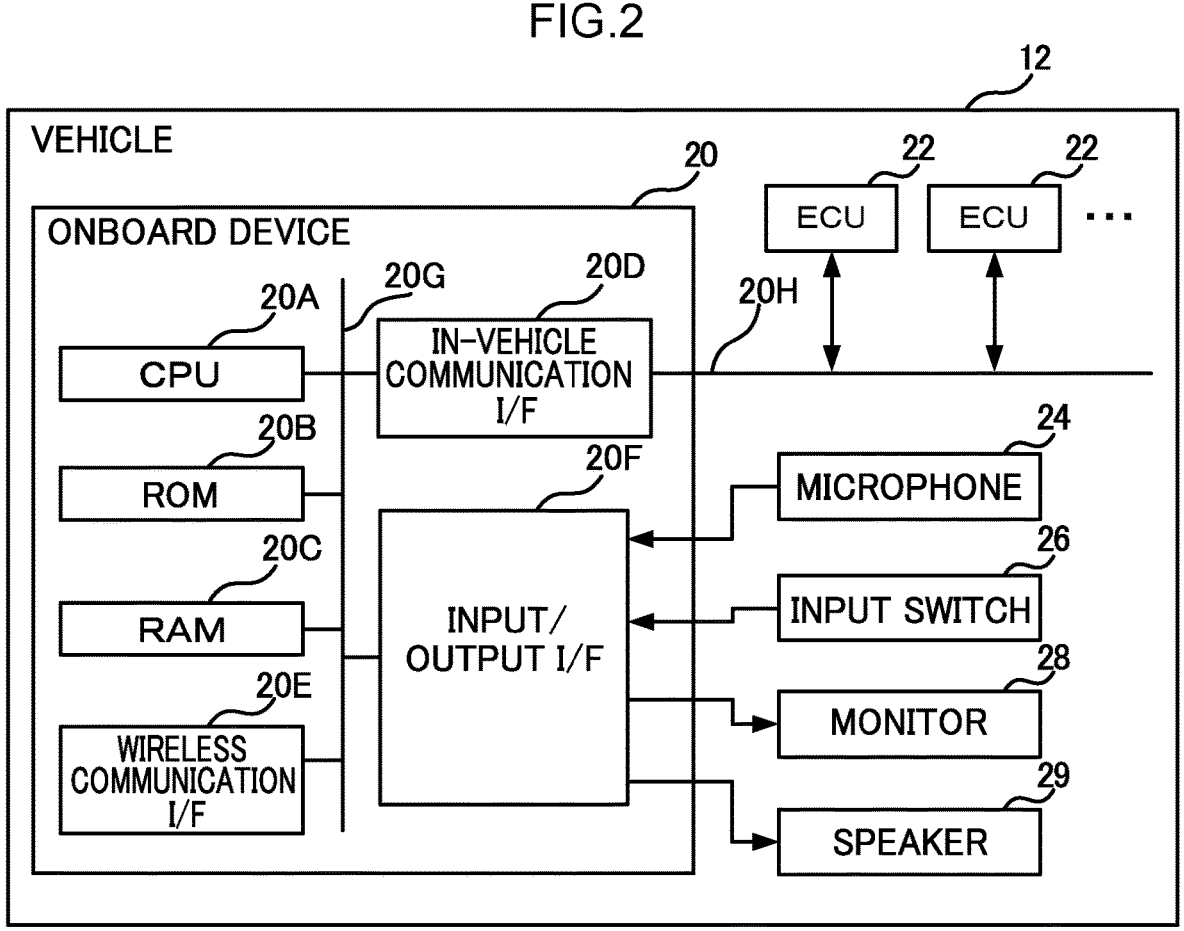
FIG. 2 is a block diagram illustrating an example of hardware configuration of a vehicle of the first exemplary embodiment.

As illustrated in FIG. 2, each of the vehicles 12 according to the present exemplary embodiment includes the onboard device 20, plural ECUs 22, a microphone 24 serving as an audio input device, an input switch 26 serving as an operation input device, a monitor 28 serving as a display device, and a speaker 29.

The onboard device 20 includes a central processing unit (CPU) 20A, read only memory (ROM) 20B, random access memory (RAM) 20C, an in-vehicle communication interface (I/F) 20D, a wireless communication I/F 20E, and an input/output I/F 20F. The CPU 20A, the ROM 20B, the RAM 20C, the in-vehicle communication I/F 20D, the wireless communication I/F 20E, and the input/output I/F 20F are connected together through an internal bus 20G so as to be capable of communicating with each other.

The CPU 20A is a central processing unit that executes various programs and controls various sections. Namely, the CPU 20A reads a program from the ROM 20B, and executes the program using the RAM 20C as a workspace.

The ROM 20B stores various programs and various data. The ROM 20B of the present exemplary embodiment is stored with a control program used to control the onboard device 20.

The RAM 20C serves as a workspace that temporarily stores programs and data.

The in-vehicle communication I/F 20D is an interface for connecting to the ECUs 22. This interface employs a CAN communication protocol. The in-vehicle communication I/F 20D is connected to an external bus 20H serving as a communication path. The ECUs 22 serve as control devices, and plural thereof are provided corresponding to respective functionality of the vehicle 12. Examples of the ECUs 22 of the present exemplary embodiment include a vehicle control ECU, an engine ECU, a brake ECU, a body ECU, a camera ECU, and a multimedia ECU.

The wireless communication I/F 20E is a wireless communication module used to communicate with the servers 30. The wireless communication module employs a communication protocol such as 5G, LTE, or Wi-Fi (registered trademark). The wireless communication I/F 20E is connected to the network N1.

The input/output I/F 20F is an interface used to communicate with the microphone 24, the input switch 26, the monitor 28, and the speaker 29 installed in the vehicle 12.

The microphone 24 is provided in a front pillar, dashboard, or the like of the vehicle 12, and is a device that picks up sound emanating from a user, namely an occupant of the vehicle 12.

The input switch 26 is provided to an instrument panel, a center console, a steering wheel, or the like, and is a switch configured for input operation by a finger of the occupant. For example, a push button ten-key pad or a touch pad may be employed as the input switch 26.

The monitor 28 is provided to the instrument panel, a meter panel, or the like, and is a liquid crystal monitor used to display images relating to an owner's manual and response information, described later. The monitor 28 may be provided in the form of a touch panel that doubles as the input switch 26.

The speaker 29 is provided in the instrument panel, center console, front pillar, dashboard, or the like, and is a device used to output audio relating to response information.

Servers

Figure 3:
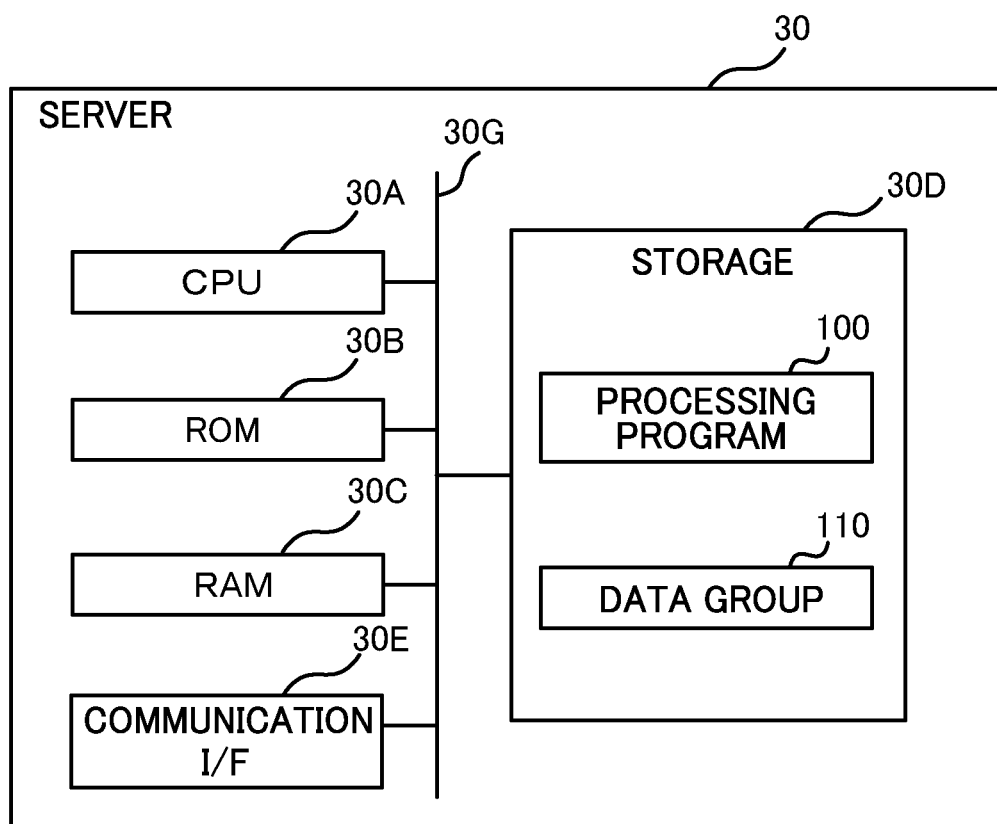
FIG. 3 is a block diagram illustrating an example of hardware configuration of a server of the first exemplary embodiment.

As illustrated in FIG. 3, each of the servers 30 includes a CPU 30A, this being an example of a hardware processor, ROM 30B corresponding to memory, RAM 30C, storage 30D, and a communication I/F 30E. The CPU 30A, the ROM 30B, the RAM 30C, the storage 30D, and the communication I/F 30F are connected together through an internal bus 30G so as to be capable of communicating with each other. The CPU 30A, the ROM 30B, the RAM 30C, and the communication I/F 30E have functionality equivalent to that of the CPU 20A, the ROM 20B, the RAM 20C, and the wireless communication I/F 20E of the onboard device 20 described above.

The storage 30D includes a hard disk drive (HDD) or a solid state drive (SSD), and is stored with various programs and various data.

The CPU 30A functions as an OMA interaction control section 36, namely a reception section 50, an acquisition section 52, a confirmation section 53, an instruction section 54, a provision section 56, and as an intent inference section 38, by loading a program from the storage 30D and executing this program using the RAM 30C as a workspace.

A processing program 100 and a data group 110 are stored in the storage 30D of the present exemplary embodiment. The processing program 100 is a program for implementing the various functionality included in the server 30.

HMI Server

The HMI server 14 includes functionality to receive questions from the onboard device 20, and to refer to the agent server 16 for a response to a question relating to an owner's manual.

Figure 5:
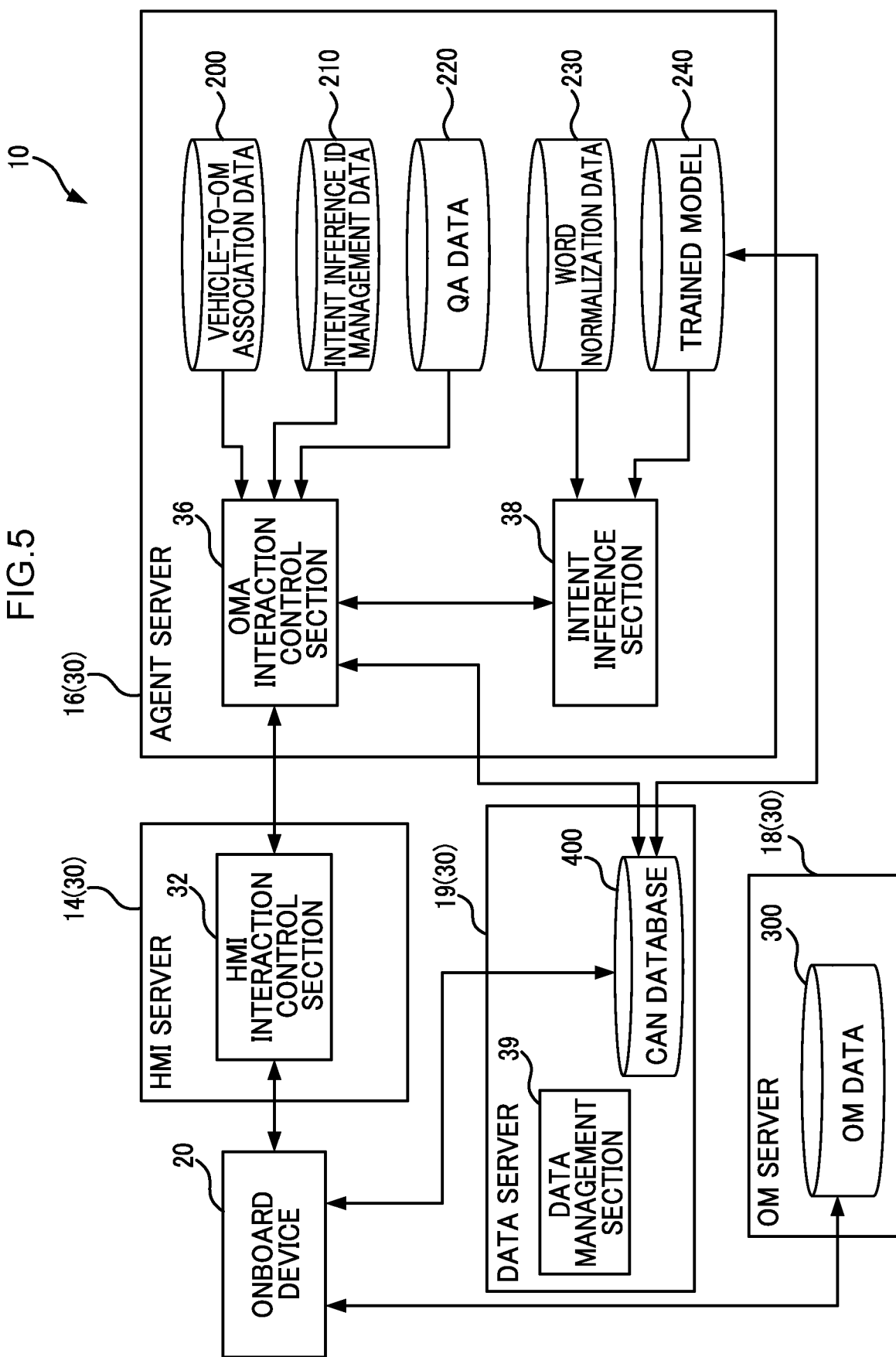
FIG. 5 is a block diagram to explain functionality of a manual provision system of the first exemplary embodiment.

As illustrated in FIG. 5, the CPU 30A of the HMI server 14 of the present exemplary embodiment executes the processing program 100 so as to function as an HMI interaction control section 32, serving as a selection section.

The HMI interaction control section 32 communicates with the onboard device 20. The HMI interaction control section 32 acquires audio information from the occupant of the vehicle 12 transmitted from the onboard device 20, performs speech recognition, and converts the audio information to text information. Note that in the present exemplary embodiment, it is anticipated that questions are asked in the form of utterances from the occupant of the vehicle 12. Accordingly, audio information relating to an occupant utterance serves as input information input to the onboard device 20 by the occupant. Input information is configured by audio information relating to a question uttered by the occupant, for example "How do I turn off this lamp?" or "What is the switch with an A in a circle?".

The HMI interaction control section 32 also interprets the intent of the occupant utterance based on the converted text information. In cases in which the HMI interaction control section 32 interprets that the occupant has asked a question relating to the owner's manual, the HMI interaction control section 32 refers to the agent server 16 regarding this question. The HMI interaction control section 32 also transmits text information relating to this question to the agent server 16, and receives response information relating to the response from the agent server 16.

The HMI interaction control section 32 also transmits the response information received from the agent server 16 to the onboard device 20. Note that the response information includes both text information and audio information relating to a response to the question. The text information includes a URL used to view HTML data from the owner's manual.

The HMI server 14 also includes functionality to confirm an association status of an agent (owner's manual agent; hereafter OMA) handling the question relating to the owner's manual, based on vehicle information acquired from the onboard device 20. This functionality will be described in detail later.

Agent Server

The agent server 16 functions as an OMA. The agent server 16 acquires vehicle information for the corresponding vehicle 12 and text information relating to the question from the HMI server 14, and also acquires CAN information, this being state information relating to a state of the vehicle 12, from the data server 19. The agent server 16 also provides the HMI server 14 with response information relating to the response to the question.

Figure 4:
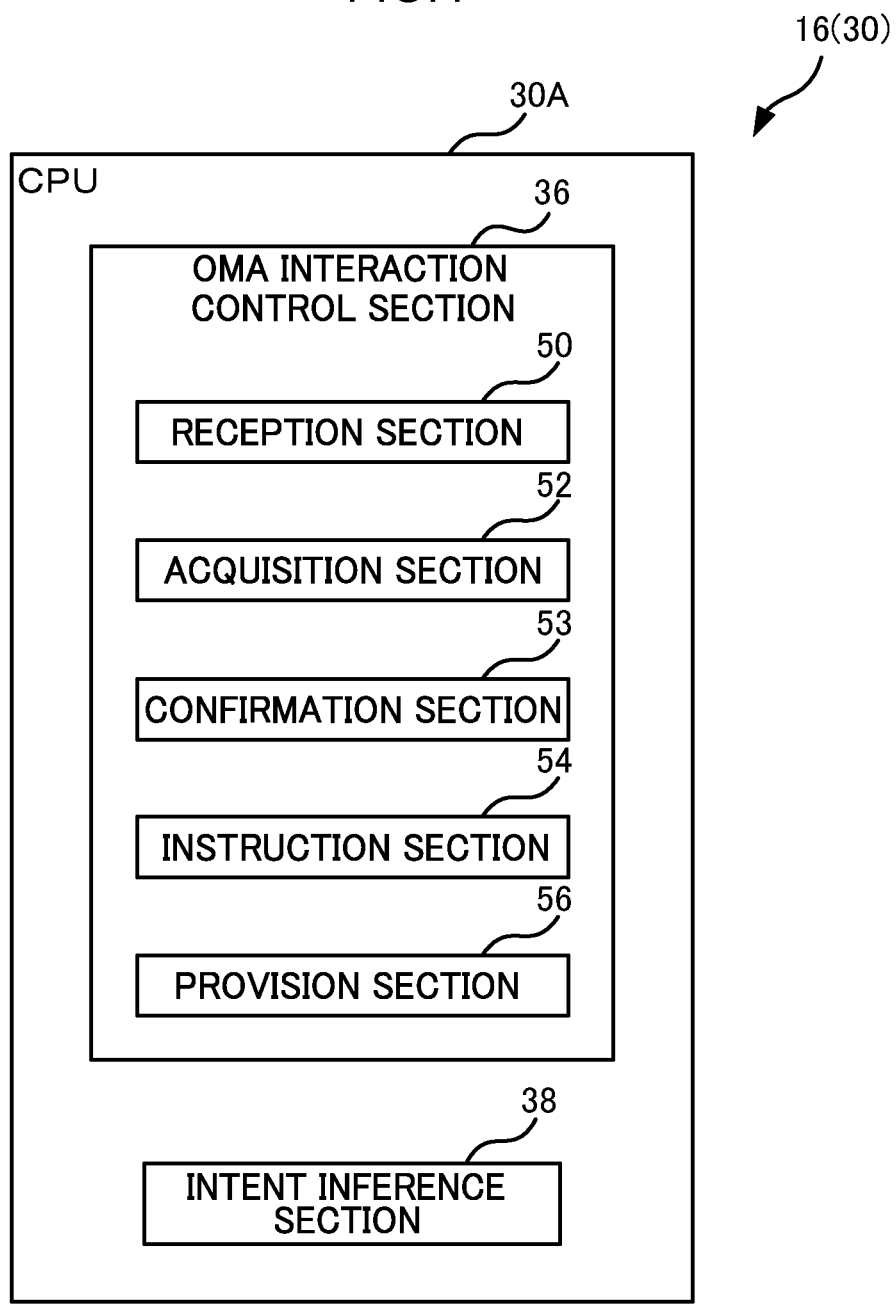
FIG. 4 is a block diagram illustrating an example of functional configuration of an agent server of the first exemplary embodiment.

In the agent server 16 of the present exemplary embodiment, the CPU 30A executes the processing program 100 so as to function as the OMA interaction control section 36 and the intent inference section 38 illustrated in FIG. 4. The OMA interaction control section 36 includes the reception section 50, the acquisition section 52, the confirmation section 53, the instruction section 54, and the provision section 56.

The data group 110 of the agent server 16 includes vehicle-to-OM association data 200, intent inference ID management data 210, QA data 220, word normalization data 230, and trained models 240, as illustrated in FIG. 5.

The vehicle-to-OM association data 200 is data in which vehicle information relating to the vehicle identification number, vehicle type, grade, equipment and so on of each of the vehicles 12 is stored in association with OM item codes allocated to respective owner's manuals. The vehicle-to-OM association data 200 is an example of a database storing association statuses of manuals stored with question responses to respective vehicles.

The intent inference ID management data 210 is data in which association relationships between the OM item codes and intent inference engines are stored. In the intent inference ID management data 210, intent inference engine IDs are stored in association with the respective OM item codes. The intent inference engine IDs are IDs allocated to respective intent inference engines used during the execution of intent inference processing, described later. Individual intent inference engines are provided for similar or related owner's manuals.

The QA data 220 is data in which response information is held linked to intent labels allocated to each response. Note that the intent labels are label numbers provided as a result of inferring intent from content uttered by an occupant. The response information relates to responses to questions, and includes text for display, images for display, text for text-to-speech readout, information regarding URLs to display owner's manuals, and so on.

The word normalization data 230 is data employed to normalize words, and is used in a pre-processing stage before intent inference processing. This pre-processing refers to processing to standardize differences in notation and phrasing. For example, the word normalization data 230 may include data for standardizing differences in notation, such as information indicating that "off" and "OFF" correspond to the same word. As another example, the word normalization data 230 may include data for standardizing differences in phrasing, such as information indicating that "tire pressure warning lamp" and "air pressure warning lamp" refer to the same thing.

The trained model 240 is data generated by performing machine learning employing training data based on past states of the vehicle 12 prior to a reception timing when the reception section 50, described later, received text information, and on past occupant questions. The input of the training data is CAN information relating to past states of the vehicle 12, and text information relating to plural expressions relevant to questions during these past states, and an intent label relating to a correct response to this question is the output. The CAN information relating to past states is an example of past state information. One of the trained models 240 is trained in advance for each intent inference engine.

Figure 6:
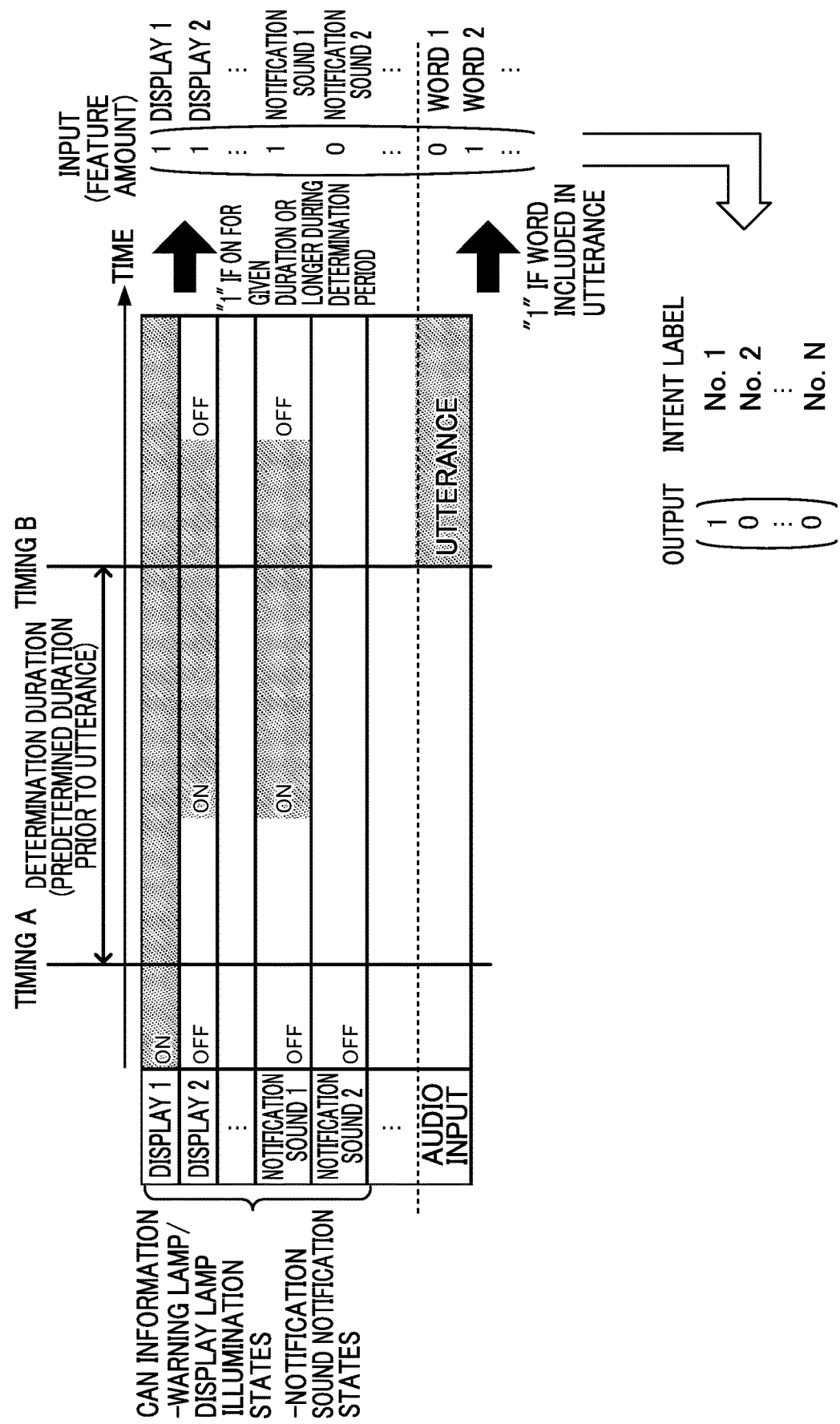
FIG. 6 is a diagram illustrating an example of a training data generation method.

FIG. 6 illustrates an example of training data based on past questions and past CAN information. As illustrated in FIG. 6, the onboard device 20 stores CAN information-based illumination states of warning lamps and display lamps and notification states of notification sounds for the corresponding vehicle 12. The onboard device 20 also stores audio input to the microphone 24.

Note that when the onboard device 20 receives an occupant utterance, the onboard device 20 also acquires active illumination state and notification state items from the CAN information for a determination period running from a timing A that is a predetermined duration prior to a reception timing B, up to the timing B. In the example in FIG. 6, during the predetermined duration from the timing A to the timing B, a display 1, a display 2, and a notification sound 1 are ON, in other words are active. The training data generates input data in which a feature amount of "1" is applied to any element that is active for a predetermined duration or longer during the determination period.

The uttered question is converted to text by speech recognition, and words are extracted therefrom. Extracted candidate words correspond to "expressions". In the example of FIG. 6, since a word 2 is included in the utterance, the feature amount of "1" is applied to the word 2 in the generated input data.

As output, intent labels associated with the intent of the utterance are applied to the input applied with feature amounts as described above. In the example of FIG. 6, a No. 1 intent label is associated with the input. In the above-described example of the present exemplary embodiment, in a case in which a question including the word 2 is asked when the display 1, the display 2, and the notification sound 1 are in active states, machine learning is performed using training data so as to generate the No. 1 intent label in response to this question.

In the OMA interaction control section 36 illustrated in FIG. 5, firstly the reception section 50 receives text information configuring question information, and also receives vehicle information. The reception section 50 is also capable of receiving the CAN information relating to the state of the vehicle 12. Next, in cases in which the text information corresponds to a question from the occupant, the acquisition section 52 of the OMA interaction control section 36 acquires a response to the question based on the vehicle information, the CAN information, and the text information. The acquired response is obtained by performing intent inference processing to infer the intent of the question.

More specifically, the acquisition section 52 consults the vehicle-to-OM association data 200 to acquire the OM item code associated with a given vehicle 12 based on the vehicle information for this vehicle 12. In cases in which the acquisition section 52 is unable to acquire an OM item code, the acquisition section 52 notifies the HMI interaction control section 32 that "this service is unavailable". The acquisition section 52 also consults the intent inference ID management data 210 to acquire the OMA intent inference engine ID applicable to the given vehicle 12 based on the acquired OM item code.

The acquisition section 52 then refers to the intent inference section 38 using input values of the text information relating to the question, the CAN information of the vehicle 12, and the OMA intent inference engine ID, and acquires an intent label corresponding to a response. In cases in which no intent label could be acquired, the provision section 56 transmits no-results information indicating that no results were found to the HMI server 14. On the other hand, in cases in which a single intent label has been acquired, the acquisition section 52 consults the QA data 220 to acquire the associated response information based on the acquired intent label and the OM item code.

Note that in cases in which plural intent labels are acquired, the acquisition section 52 may consult the QA data 220 to generate option information relating to plural response options. In cases in which option information is generated, this option information is transmitted to the onboard device 20, and result information, this being a result selected by the occupant, can be acquired from the onboard device 20 in order to identify a single intent label.

The confirmation section 53 of the OMA interaction control section 36 includes functionality to confirm an association status of the vehicle 12 to the OMA. As the OMA association status, confirmation may be made not only as to whether or not generation of a response to any occupant question is possible, but also as to whether or not generation of a response to certain questions is possible. The confirmation section 53 searches the vehicle-to-OM association data 200 and confirms the OMA association status based on the presence or absence of an OM item code associated with the vehicle information received by the reception section 50.

The instruction section 54 of the OMA interaction control section 36 instructs the onboard device 20 such that the onboard device 20 blocks receipt of questions falling within a scope for which the confirmation section 53 has confirmed that response generation is not possible. The functionality of the instruction section 54 will be described in detail later.

The provision section 56 of the OMA interaction control section 36 transmits one out of no-results information, response information, or option information to the HMI interaction control section 32 of the HMI server 14. More specifically, in cases in which the acquisition section 52 has been unable to acquire an intent label, the acquisition section 52 transmits no-results information to the HMI server 14. In cases in which the acquisition section 52 has acquired a single intent label, the acquisition section 52 transmits the associated response information to the HMI server 14. In cases in which the acquisition section 52 has acquired plural intent labels, the acquisition section 52 transmits the generated option information to the HMI server 14.

The intent inference section 38, serving as an inference section, executes intent inference processing as inference processing to infer the intent of a question from an occupant. The intent inference processing is executed employing the intent inference engine associated with the intent inference engine ID. Specific explanation follows regarding execution of the intent inference processing. Firstly, the intent inference section 38 uses the word normalization data 230 to perform pre-processing on the text of the acquired text information. The pre-processing standardizes differences in notation and differences in phrasing. Next, the intent inference section 38 inputs the trained model 240 prepared for the corresponding intent inference engine with the pre-processed text information and the CAN information of the vehicle 12, and outputs an intent label and confidence score. The confidence score corresponds to a probability that the text information input to the trained model 240 matches the inferred intent label. The intent inference section 38 then provides any intent labels having a confidence score exceeding a predetermined value, namely intent labels vouched to have at least a predetermined probability of dependability, to the OMA interaction control section 36.

OM Server

The OM server 18 is a server 30 that provides an owner's manual. The data group 110 of the OM server 18 includes OM data 300, this being HTML data relating to owner's manuals. In a case in which an image relating to response information is displayed on the monitor 28 of the vehicle 12, the occupant selects a URL included in the image to execute a transmission request for HTML data associated with the URL to the OM server 18. The HTML data of the owner's manual associated with the URL is thus transmitted to the onboard device 20 to be displayed on the monitor 28.

Data Server

The data server 19 is a server 30 that acquires CAN information from the onboard device 20, and provides CAN information to the agent server 16. The CPU 30A of the data server 19 of the present exemplary embodiment executes the processing program 100 so as to function as a data management section 39.

The data group 110 of the data server 19 includes a CAN database 400 configured of data including vehicle information of the respective vehicles 12 and CAN information associated with the vehicle information. The data management section 39 acquires the CAN information for the respective vehicles 12 from the onboard devices 20 at predetermined intervals, and stores this in the CAN database 400. The data management section 39 also provides CAN information to the agent server 16 when requested to do so by the agent server 16.

Note that by acquiring CAN information and audio information relating to questions from the onboard devices 20, the data management section 39 of the data server 19 is able to generate training data to generate new trained models 240 by performing machine learning. The new trained models 240 thus generated are transmitted to the agent server 16 as updates.

Figure 7:
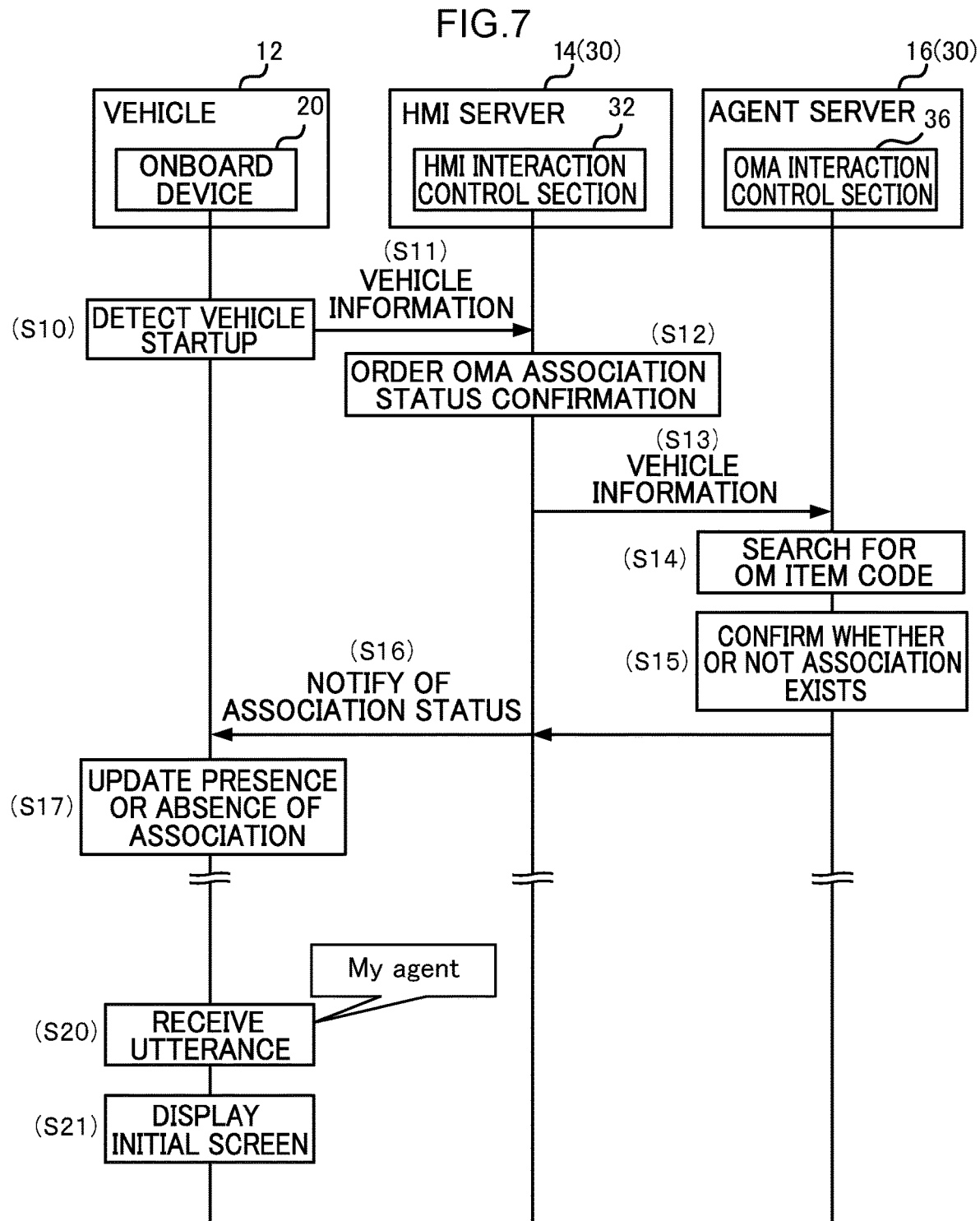
FIG. 7 is a sequence chart illustrating an example of a flow of processing relating to confirmation of an agent association status and processing to reflect the association status on a monitor in a manual provision system of the first exemplary embodiment.

Control Flow (1) Processing Relating to Agent Association Status Confirmation and Processing to Reflect Association Status on Monitor Explanation follows regarding processing performed for the respective vehicles 12, including processing relating to OMA association status confirmation and processing to reflect this association status on the monitor 28, with reference to the sequence chart of FIG. 7.

Firstly, explanation follows regarding processing to confirm the OMA association status.

At step S10 in FIG. 7, the onboard device 20 detects start-up of the corresponding vehicle 12. Start-up here refers to a state in which an accessory switch (ACC) has been turned ON.

At step S11, the onboard device 20 transmits vehicle information of the vehicle 12 to the HMI server 14.

At step S12, the HMI interaction control section 32 of the HMI server 14 orders confirmation of the OMA association status. Namely, the HMI interaction control section 32 sends a confirmation request to the agent server 16.

At step S13, the HMI interaction control section 32 transmits vehicle information to the OMA interaction control section 36 of the agent server 16.

At step S14, the OMA interaction control section 36 searches the OM item codes. More specifically, the OMA interaction control section 36 consults the vehicle-to-OM association data 200 to search for whether or not an OM item code associated with the acquired vehicle information is present.

At step S15, the OMA interaction control section 36 confirms whether or not an OMA association exists. More specifically, in cases in which the OMA interaction control section 36 is able to find an OM item code associated with the vehicle information, the OMA interaction control section 36 confirms an association exists, and in cases in which the OMA interaction control section 36 is unable to find an OM item code associated with the vehicle information, the OMA interaction control section 36 confirms an association does not exist.

At step S16, the OMA interaction control section 36 notifies the onboard device 20 of the association status via the HMI server 14.

At step S17, the onboard device 20 updates the presence or absence of OMA association.

Next, explanation follows regarding processing to reflect the OMA association status on the monitor 28.

At step S20 in FIG. 7, the onboard device 20 receives an utterance. For example, suppose the occupant of the vehicle 12 says "My agent", this being a keyword used to start up the agent, into the microphone 24.

Figure 8:
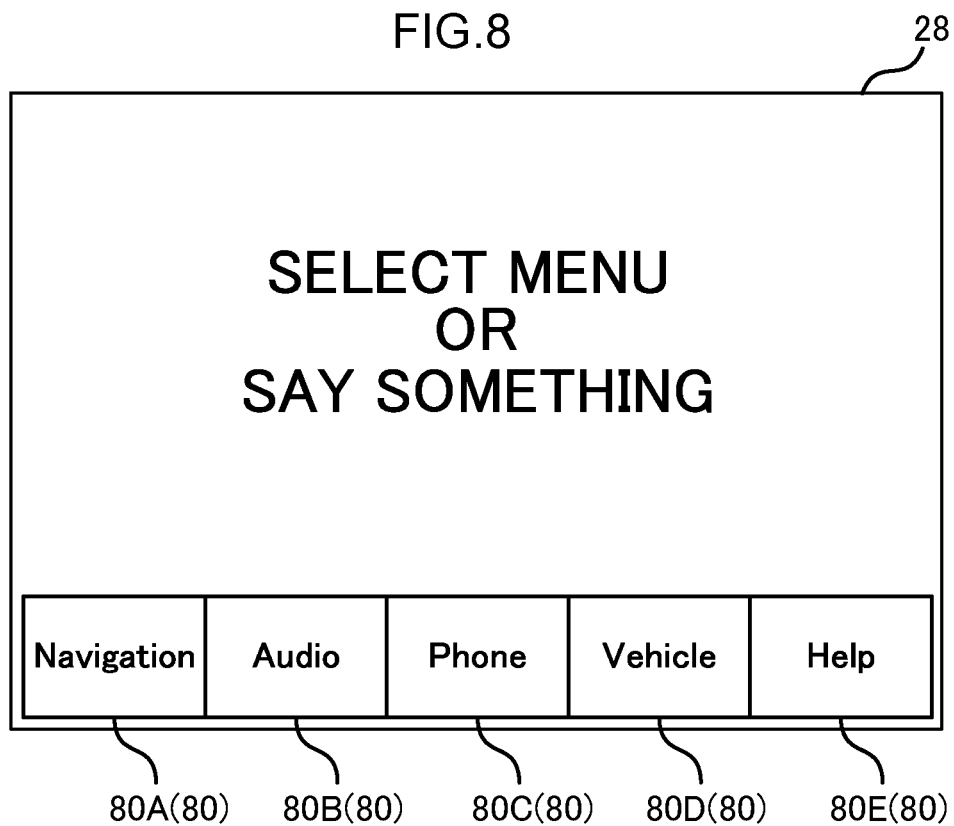
FIG. 8 illustrates an example of display on a monitor in a case in which agent association exists.
Figure 9:
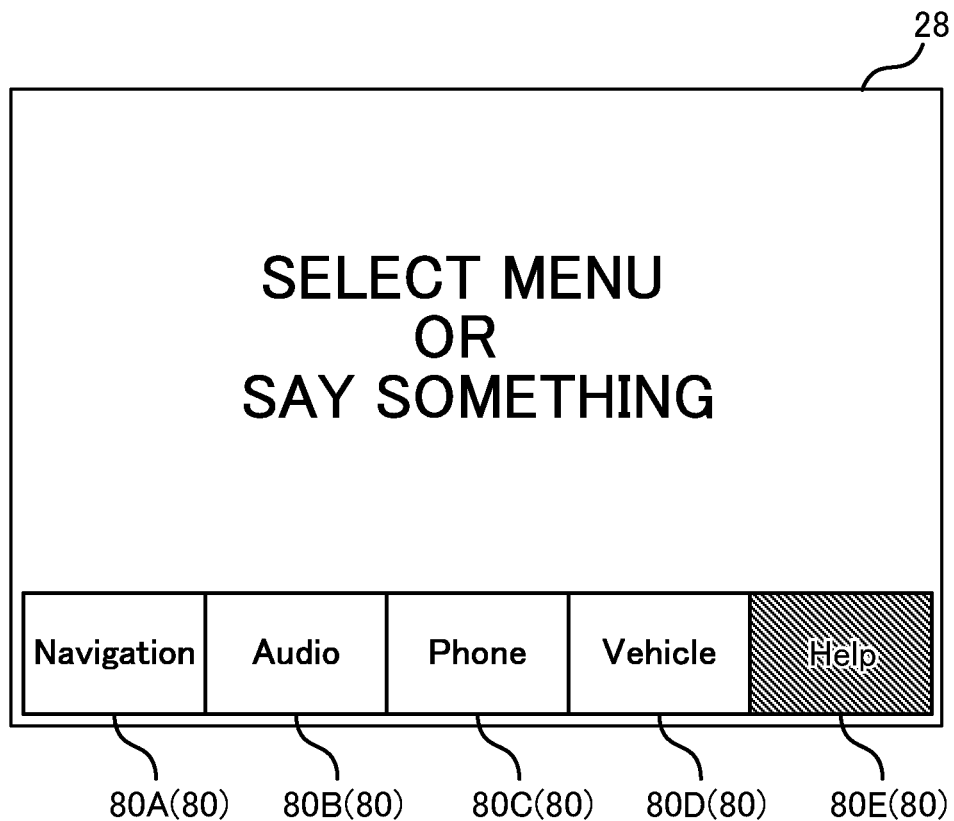
FIG. 9 is illustrates an example of display on a monitor in a case in which agent association does not exist.

When this is performed, at step S21, the onboard device 20 displays an initial screen relating to agent functionality on the monitor 28. FIG. 8 and FIG. 9 are examples of the initial screen displayed on the monitor 28. Plural input buttons 80 relating to functionality of the onboard device 20 are displayed on the monitor 28. The input buttons 80 include a navigation button 80A, an audio button 80B, a phone call button 80C, a vehicle function button 80D, and a help button 80E. In the present exemplary embodiment, the help button 80E is associated with an OMA.

When the initial screen is displayed on the monitor 28, in cases in which OMA association exists, as illustrated in FIG. 8 the help button 80E is displayed as active and is selectable. On the other hand, when the initial screen is displayed on the monitor 28, in cases in which OMA association does not exist, as illustrated in FIG. 9 the help button 80E display is grayed out and is not selectable. In such cases, the onboard device 20 is unable to receive questions relating to functionality of the vehicle 12 when the display has been grayed out.

(2) Processing to Present Response to Question

Figure 10:
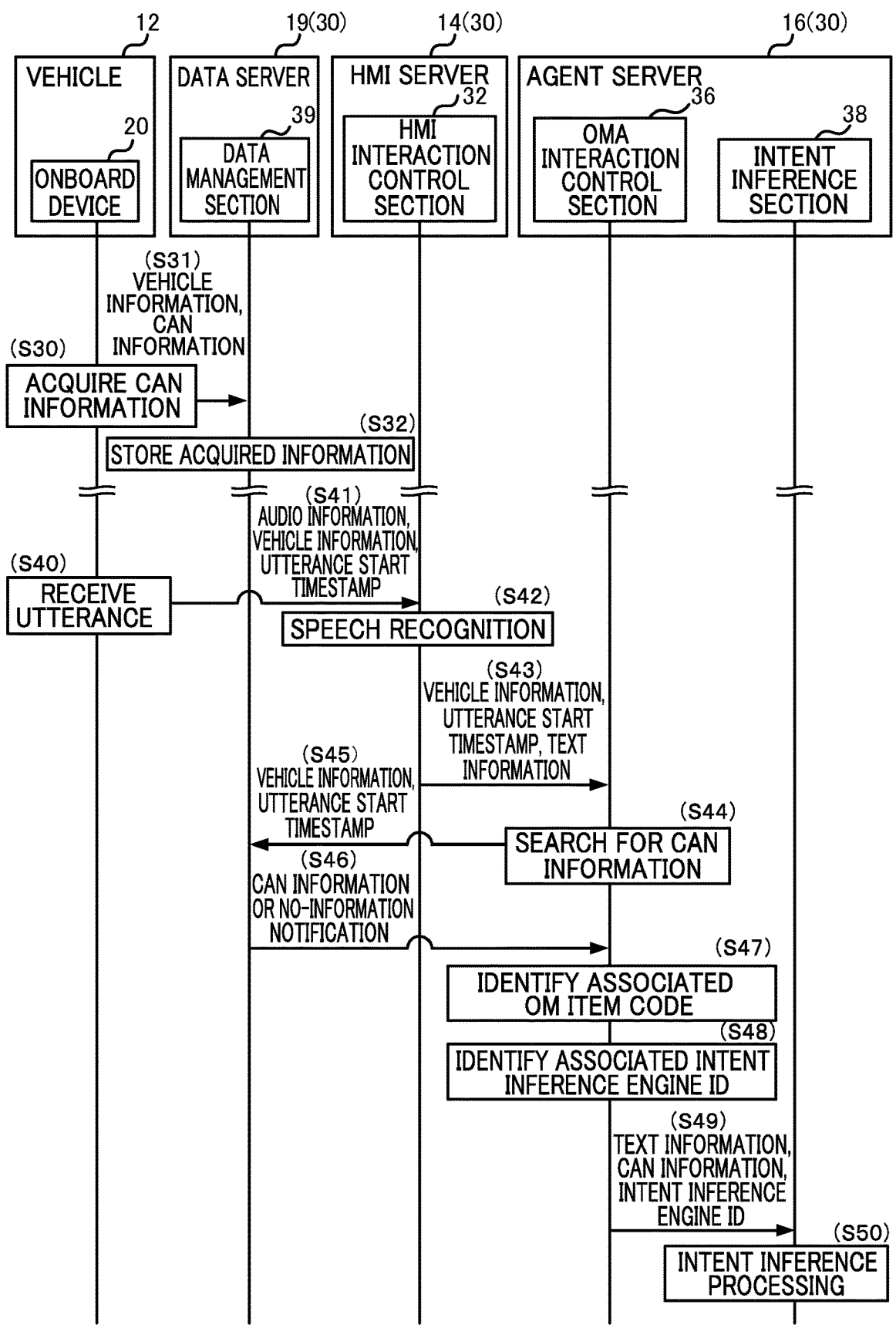
FIG. 10 is a sequence chart illustrating an example of a flow of processing to infer the intent of a question in a manual provision system of the first exemplary embodiment.
Figure 11:
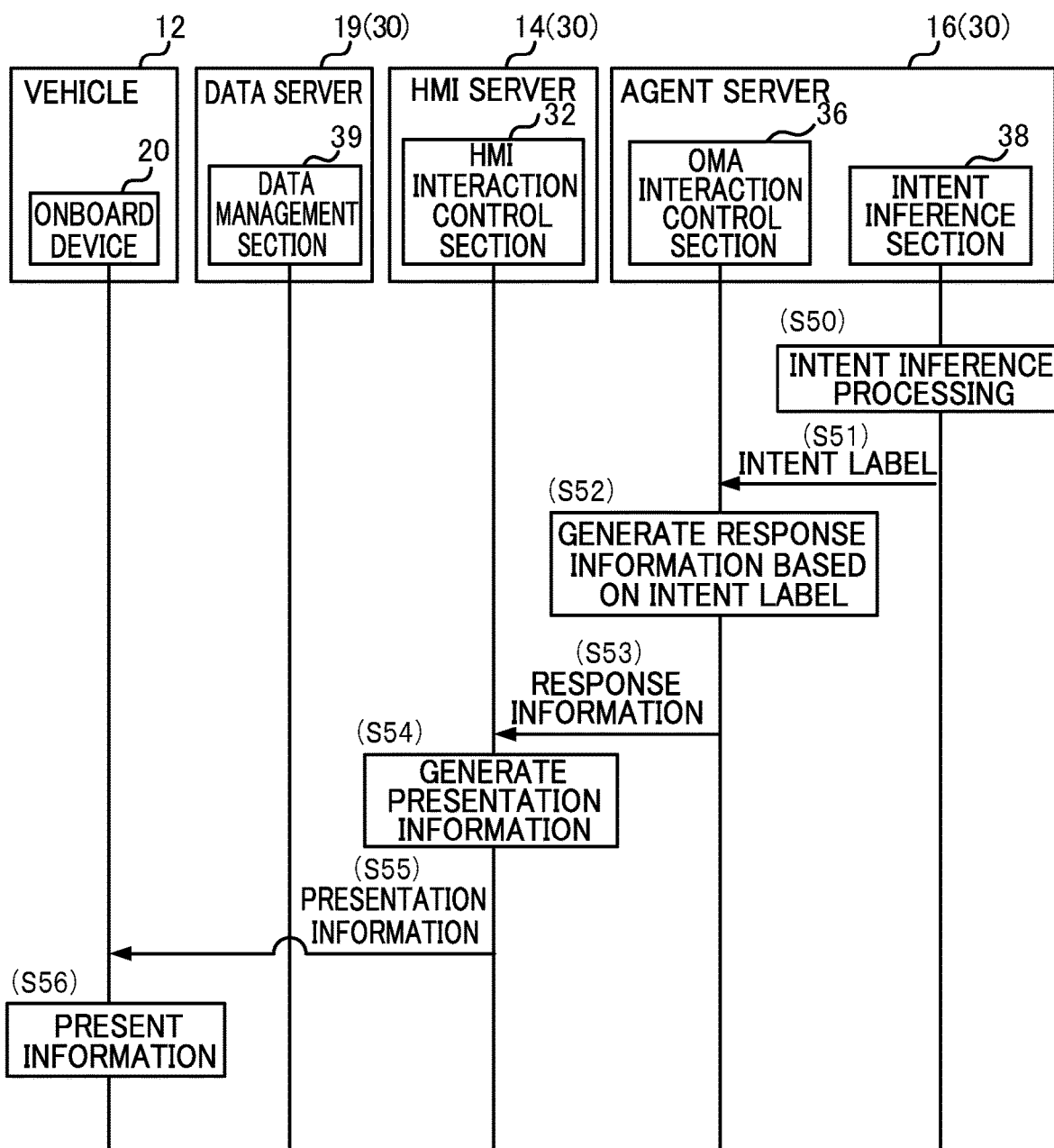
FIG. 11 is a sequence chart (continued from FIG. 10) illustrating an example of a flow of processing to infer the intent of a question in a manual provision system of the first exemplary embodiment.

Explanation follows regarding processing performed when the occupant of the vehicle 12 has asked a question, up to and including presentation of a response, with reference to the sequence charts of FIG. 10 and FIG. 11.

At step S30 in FIG. 10, the onboard device 20 acquires CAN information through the external bus 20H.

At step S31, the onboard device 20 transmits the acquired CAN information to the data server 19 together with vehicle information of the vehicle 12. Note that although in the present exemplary embodiment the vehicle information and the CAN information are transmitted from the onboard device 20 to the data server 19 at predetermined intervals, there is no limitation thereto, and transmission from the onboard device 20 to the data server 19 may be performed whenever the CAN information changes.

At step S32, the data server 19 stores the information acquired by the data management section 39 in the CAN database 400. The stored information includes vehicle information, CAN information, and a reception timestamp.

At step S40, the onboard device 20 receives an utterance from the occupant. More specifically, the CPU 20A of the onboard device 20 acquires audio uttered into the microphone 24 by the occupant as audio information. For example, suppose that the occupant utters the phrase "A meter lamp has come on, but what does it mean?" in a state in which a tire pressure warning lamp of the vehicle 12 has lit up. When this is performed, the utterance is received such that the utterance of "A meter lamp has come on, but what does it mean" is acquired as audio information.

At step S41, the onboard device 20 transmits the acquired audio information to the HMI server 14 together with vehicle information of the vehicle 12 and an utterance start timestamp.

At step S42, the HMI interaction control section 32 of the HMI server 14 performs speech recognition. The audio information is thus converted into text information. Note that when this speech recognition is performed, the audio information is determined to be a question in cases in which a linguistic feature corresponding to a question is included in the text information.

At step S43, the HMI interaction control section 32 transmits the vehicle information, the utterance start timestamp, and the text information to the OMA interaction control section 36 of the agent server 16. In the above example, the text string "A meter lamp has come on, but what does it mean" that has been determined to be a question is transmitted as the text information.

At step S44, the OMA interaction control section 36 searches for CAN information. Namely, the OMA interaction control section 36 attempts to acquire CAN information from the data server 19.

At step S45, the OMA interaction control section 36 transmits the vehicle information and the utterance start timestamp to the data server 19.

At step S46, the data management section 39 of the data server 19 transmits CAN information or no-information notification to the agent server 16. The transmitted CAN information is acquired by the data management section 39 referring to the CAN database 400 and searching for CAN information relating to the vehicle information of the vehicle 12 and also relating to a reception timestamp just before the utterance start timestamp. Note that the no-information notification is notification to indicate that there is no CAN information in cases in which CAN information associated with the vehicle information and the utterance start timestamp could not be acquired.

At step S47, the OMA interaction control section 36 identifies an associated OM item code based on the vehicle information. Namely, the OMA interaction control section 36 identifies an owner's manual associated with the vehicle identification number, vehicle type, grade, equipment, or the like of the vehicle 12. Note that the CAN information may also be employed to identify the OM item code. In such cases, if the OMA interaction control section 36 is unable to acquire the newest CAN information of the vehicle 12 as a result of poor communication or the like, the OM item code considered standard for the vehicle type or grade may be identified.

At step S48, the OMA interaction control section 36 identifies the associated intent inference engine ID based on the OM item code. Namely, the intent inference engine associated with the owner's manual of the vehicle 12 is identified. Note that CAN information may also be employed to identify the intent inference engine ID. In such cases, if the OMA interaction control section 36 is unable to acquire the newest CAN information of the vehicle 12 as a result of poor communication or the like, the intent inference engine ID considered standard for the vehicle type or grade may be identified.

At step S49, the OMA interaction control section 36 provides the text information acquired from the HMI server 14, the CAN information acquired from the data server 19, and the intent inference engine ID to the intent inference section 38.

At step S50, the intent inference section 38 executes intent inference processing. The intent inference section 38 thus outputs intent labels associated with the text information and the CAN information. In the example of the present exemplary embodiment, intent labels associated with the intent inferred from the text information of "A meter lamp has come on, but what does it mean" are output.

Moving on to FIG. 11, at step S51, the intent inference section 38 provides the OMA interaction control section 36 with the single intent label with the highest confidence score.

Note that in cases in which an intent label with a confidence score exceeding the predetermined value is not output, the intent inference section 38 provides the OMA interaction control section 36 with no-label information to indicate that no intent label has been returned.

At step S52, the OMA interaction control section 36 generates response information based on the intent label. Namely, the OMA interaction control section 36 consults the QA data 220 to generate response information configured by a combination of text for display, images for display, text for text-to-speech readout, a URI, to display the owner's manual, and the like.

At step S53, the OMA interaction control section 36 transmits the response information to the HMI server 14.

At step S54, the HMI interaction control section 32 generates presentation information. The presentation information is information for transmission to the onboard device 20, and is response information from which information that does not need to be presented using the monitor 28 or the speaker 29, for example the intent label, the OM item code, and the like, has been cut. Note that the response information may also be employed as-is as the presentation information.

At step S55, the HMI interaction control section 32 transmits the presentation information to the onboard device 20.

Figure 12:
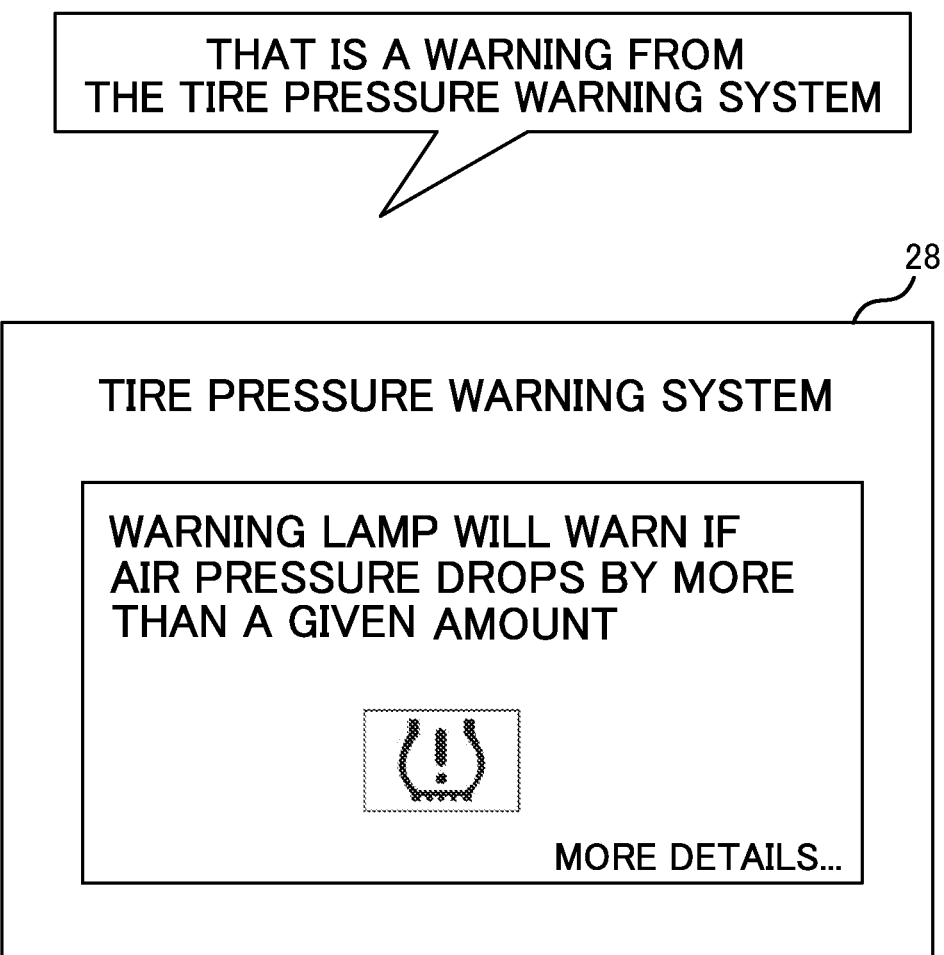
FIG. 12 is a diagram illustrating an example of information relating to response information presented to an occupant.

At step S56, the onboard device 20 presents the received presentation information to the occupant of the vehicle 12. More specifically, the CPU 20A of the onboard device 20 displays images relating to the received presentation information on the monitor 28, and outputs audio relating to the received presentation information from the speaker 29. For example, as illustrated in FIG. 12, the CPU 20A displays an explanation regarding the tire pressure warning system on the monitor 28, and outputs "That is a warning from the tire pressure warning system" as audio from the speaker 29.

Summary of First Exemplary Embodiment

The manual provision system 10 of the present exemplary embodiment is capable of providing a response to the onboard device 20 obtained by inferring the intent of the question when the occupant of the vehicle 12 asks a question which is input via the onboard device 20.

In the agent server 16 of the present exemplary embodiment, the reception section 50 that receives text information receives vehicle information when the vehicle 12 is started up. Based on the vehicle information, the confirmation section 53 confirms a scope of questions for which response generation is not possible. Note that cases in which "response generation is not possible" include cases in which an owner's manual stored with responses to questions has not been compiled, and cases in which an owner's manual is temporarily unavailable due to an update in progress. The instruction section 54 instructs the onboard device 20 such that the onboard device 20 blocks receipt of questions falling within the scope for which the confirmation section 53 has confirmed that response generation is not possible. Accordingly, the present exemplary embodiment is capable of suppressing a sense of frustration felt by the occupant in cases in which response generation is not possible for questions regarding some or all functionality.

Since the scope of questions for which response generation is not possible is confirmed at the point when the vehicle 12 is started up, questions are not received in error, thus enabling a sense of frustration felt by the user to be suppressed. Note that the vehicle information reception timing does not necessarily have to be when the vehicle 12 is started up.

Moreover, the confirmation section 53 of the agent server 16 of the present exemplary embodiment searches the vehicle-to-OM association data 200 in which the associations between owner's manuals and corresponding vehicles 12 are stored in order to confirm the scope of questions for which response generation is not possible. In the present exemplary embodiment, compiling a database regarding the availability or unavailability of an owner's manual for each vehicle 12 enables simpler management to block receipt of questions for which response generation is not possible by the onboard device 20.

The reception section 50 of the agent server 16 of the present exemplary embodiment receives CAN information of the vehicle 12 in addition to question information. The intent inference section 38 performs intent inference processing as inference processing employing both text information and CAN information, and the acquisition section 52 acquires a response to the question based on the inferred intent. The agent server 16 of the present exemplary embodiment is capable of taking the state of the vehicle 12 into account when inferring the intent of a question, enabling the precision with which intent is inferred to be improved.

Moreover, the agent server 16 of the present exemplary embodiment infers intent using the trained model 240 generated in advance by the intent inference section 38 performing machine learning. The present exemplary embodiment enables training using more information regarding the vehicles 12 and expressions, thereby enabling the precision with which the intent of an occupant's question is inferred to be improved. Note that in the data server 19, extra machine learning may be performed by acquiring CAN information and response results to questions in order to generate new trained models 240. Moreover, the trained models 240 of the agent server 16 are updated, enabling the inference precision to be further improved.

The agent server 16 of the present exemplary embodiment is capable of acquiring CAN information of the vehicle 12 through the external bus 20H that connects the plural ECUs 22 that control the vehicle 12 together. In the present exemplary embodiment, utilizing this vehicle control communication information enables simple acquisition of the state of the vehicle 12 from the vehicle 12.

In the agent server 16 of the present exemplary embodiment, as illustrated in FIG. 6, machine learning is performed based on the state of the vehicle 12 during the predetermined duration. Accordingly, in the present exemplary embodiment, setting the predetermined duration to a duration in which, for example, the occupant will have had a chance to notice a warning lamp or the like enables a state of the vehicle 12 of which the occupant is likely to be conscious to be taken into account when inferring the intent.

In the manual provision system 10 according to the present exemplary embodiment, the onboard device 20 installed to the vehicle 12 is capable of providing a response to a question from the occupant. The present exemplary embodiment is thus capable of enhancing convenience of operation for the occupant of the vehicle 12.

In the present exemplary embodiment, the onboard device 20 is configured to gray out display of an input button 80 on the monitor 28 as illustrated in FIG. 9, and block reception of operation through the input button 80. The present exemplary embodiment is thus capable of visually conveying to the occupant when the agent is not available.

Note that although in the present exemplary embodiment explanation has been given in which the corresponding input button 80 is grayed out when blocked from receiving operation, there is no limitation thereto. For example, text reading "unavailable" or the like may be displayed overlaid on the input button 80.

The onboard device 20 of the present exemplary embodiment may also display text reading "preparing . . . ", "loading . . . " or similar adjacent to or overlaid on the corresponding input button 80 in cases in which an owner's manual associated with the vehicle 12 is about to become available. In cases in which the onboard device 20 has completed procurement of an owner's manual associated with the vehicle 12, text such as "new" or "available today!" may be displayed adjacent to or overlaid on the corresponding input button 80. Moreover, the onboard device 20 may change the color of the input button 80 over time, or gradually reduce the grayed out effect, as the owner's manual associated with the vehicle 12 transitions from being in the process of being procured to procurement being completed.

"Procurement" of the owner's manual refers to adding the associated owner's manual to the OM data 300 of the OM server 18 and adding information associated with the owner's manual of the vehicle 12 to the vehicle-to-OM association data 200 of the agent server 16.

Second Exemplary Embodiment

In the first exemplary embodiment, the intent inference processing is executed based on text information and CAN information, and a single intent label is acquired. By contrast, in a second exemplary embodiment, plural intent labels are acquired during the intent inference processing, and the CAN information is consulted to execute intent identification processing to narrow down to a single intent label. Namely, the intent inference processing and the intent identification processing are executed as the inference processing. Explanation follows regarding points that differ from the first exemplary embodiment in the processing performed in order to present a response to a question.

Figure 13:
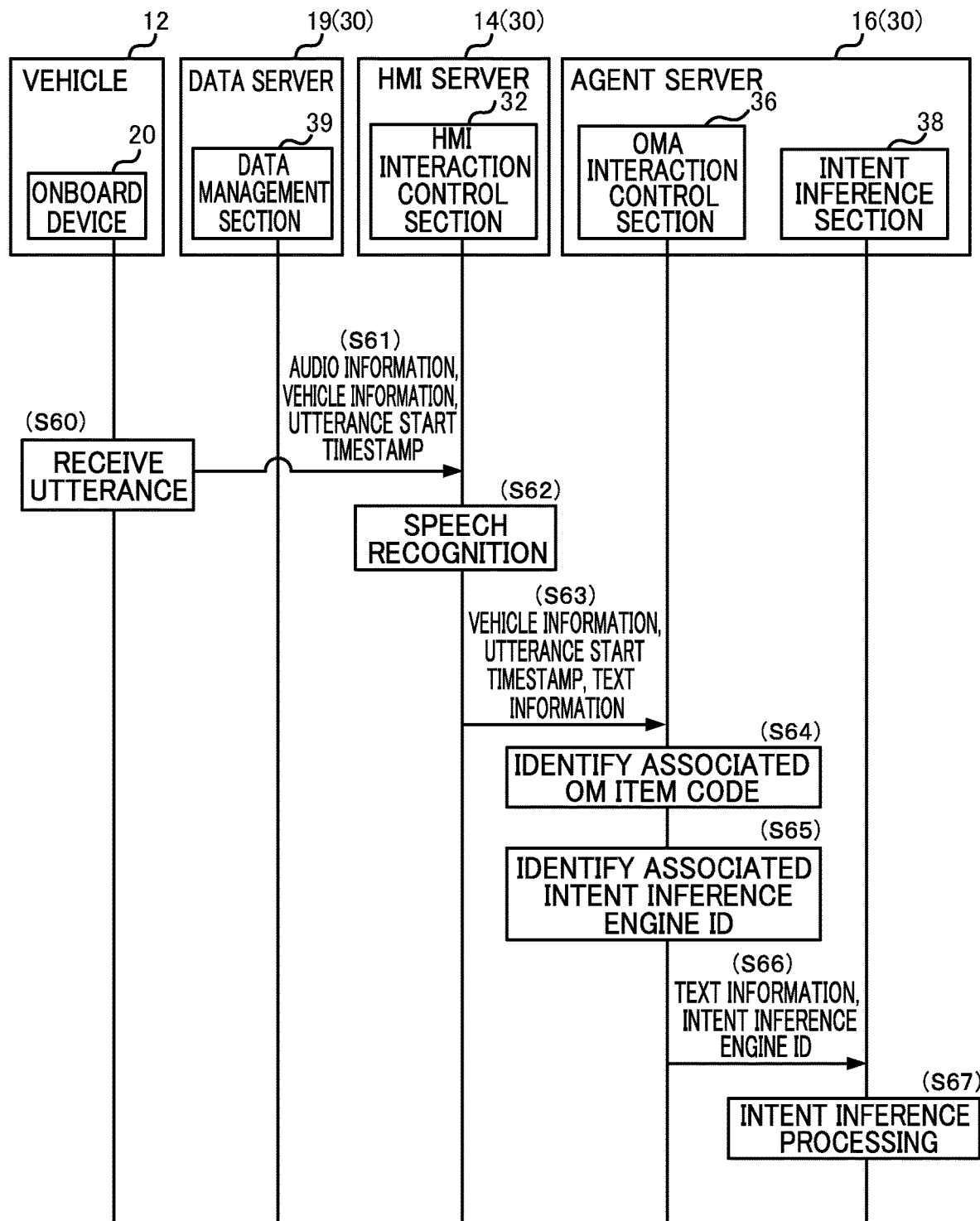
FIG. 13 is a sequence chart illustrating an example of a flow of processing to infer the intent of a question in a manual provision system of a second exemplary embodiment.
Figure 14:
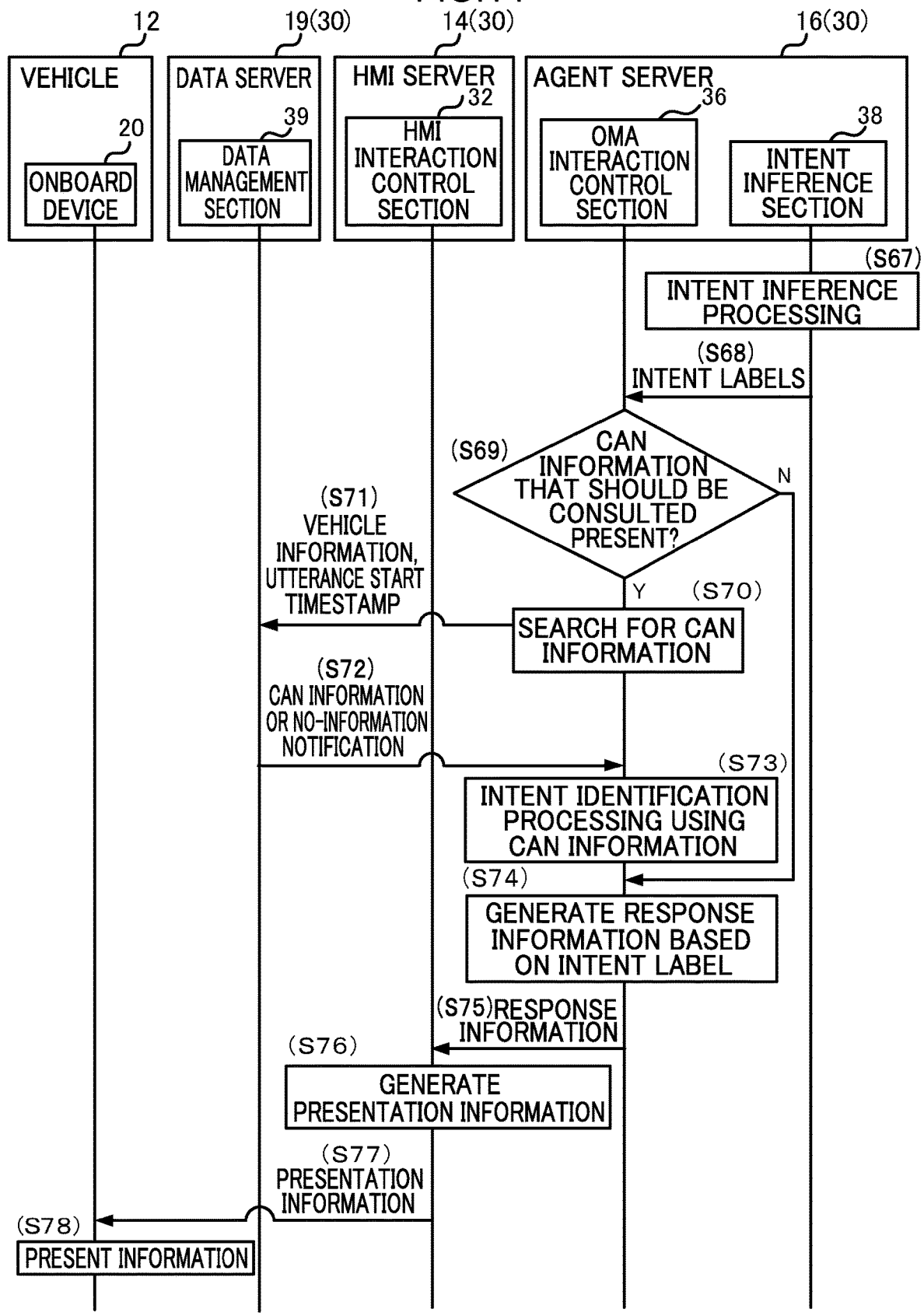
FIG. 14 is a sequence chart (continued from FIG. 13) illustrating an example of a flow of processing to infer the intent of a question in a manual provision system of the second exemplary embodiment.

Explanation follows regarding processing performed in the present exemplary embodiment from when the occupant of the vehicle 12 asks a question until presentation of a response, with reference to the sequence charts of FIG. 13 and FIG. 14.

The processing from step S60 to step S63 in FIG. 13 matches the processing of step S40 to step S43 in FIG. 10.

At step S64, the OMA interaction control section 36 identifies the OM item code associated with the vehicle information. Namely, an owner's manual associated with the vehicle identification number, vehicle type, grade, equipment, or the like of the vehicle 12 is identified.

At step S65, the OMA interaction control section 36 identifies the intent inference engine ID associated with the OM item code. Namely, the intent inference engine associated with the owner's manual of the vehicle 12 is identified.

At step S66, the OMA interaction control section 36 provides the text information and the intent inference engine ID acquired from the HMI server 14 to the intent inference section 38.

At step S67, the intent inference section 38 executes the intent inference processing, this being one part of the inference processing. The intent inference section 38 thereby outputs intent labels associated with the text information. For example, plural intent labels associated with the inferred intent of the text information "A meter lamp has come on, but what does it mean" are output.

Moving on to FIG. 14, at step S68, the intent inference section 38 provides the OMA interaction control section 36 with plural intent labels that have confidence scores exceeding a predetermined value. Note that in cases in which no intent labels with a confidence score exceeding the predetermined value are output, the intent inference section 38 provides the OMA interaction control section 36 with no-label information to indicate that no intent labels have been returned.

At step S69, the OMA interaction control section 36 determines whether or not any CAN information that should be consulted is present. For example, suppose that as a result of the intent inference processing, intent labels relating to warning lamps relevant to a display 1, a display 2, and a display 10 are acquired. In such cases, since CAN information relating to these warning lamps can be consulted, CAN information that should be consulted is determined to be present. The OMA interaction control section 36 proceeds to step S70 in cases in which CAN information that should be consulted is determined to be present. On the other hand, the OMA interaction control section 36 proceeds to step S74 in cases in which CAN information that should be consulted is determined not to be present.

At step S70, the OMA interaction control section 36 searches for the CAN information. Namely, the OMA interaction control section 36 attempts to acquire CAN information from the data server 19.

At step S71, the OMA interaction control section 36 transmits the vehicle information and the utterance start timestamp to the data server 19.

At step S72, the data management section 39 of the data server 19 transmits the CAN information or the no-information notification to the agent server 16. Specific details of this step match those of step S46 in FIG. 10.

At step S73, the OMA interaction control section 36, serving as an identification section, executes the intent identification processing, this being one element of the inference processing using the CAN information. From the plural intent labels, the OMA interaction control section 36 acquires a single intent label associated with the CAN information. For example, in cases in which CAN information indicating that the tire pressure warning lamp has lit up has been acquired, an intent label relating to the tire pressure warning system is acquired from out of the plural intent labels. Namely, inference processing is executed by the intent inference processing performed by the intent inference section 38 and by the intent identification processing performed by the OMA interaction control section 36.

The subsequent processing from step S74 to step S78 matches the processing of step S52 to step S56 in FIG. 11.

By performing the above processing, the manual provision system 10 of the present exemplary embodiment is capable of obtaining similar advantageous effects to those of the first exemplary embodiment.

Third Exemplary Embodiment

Figure 15:
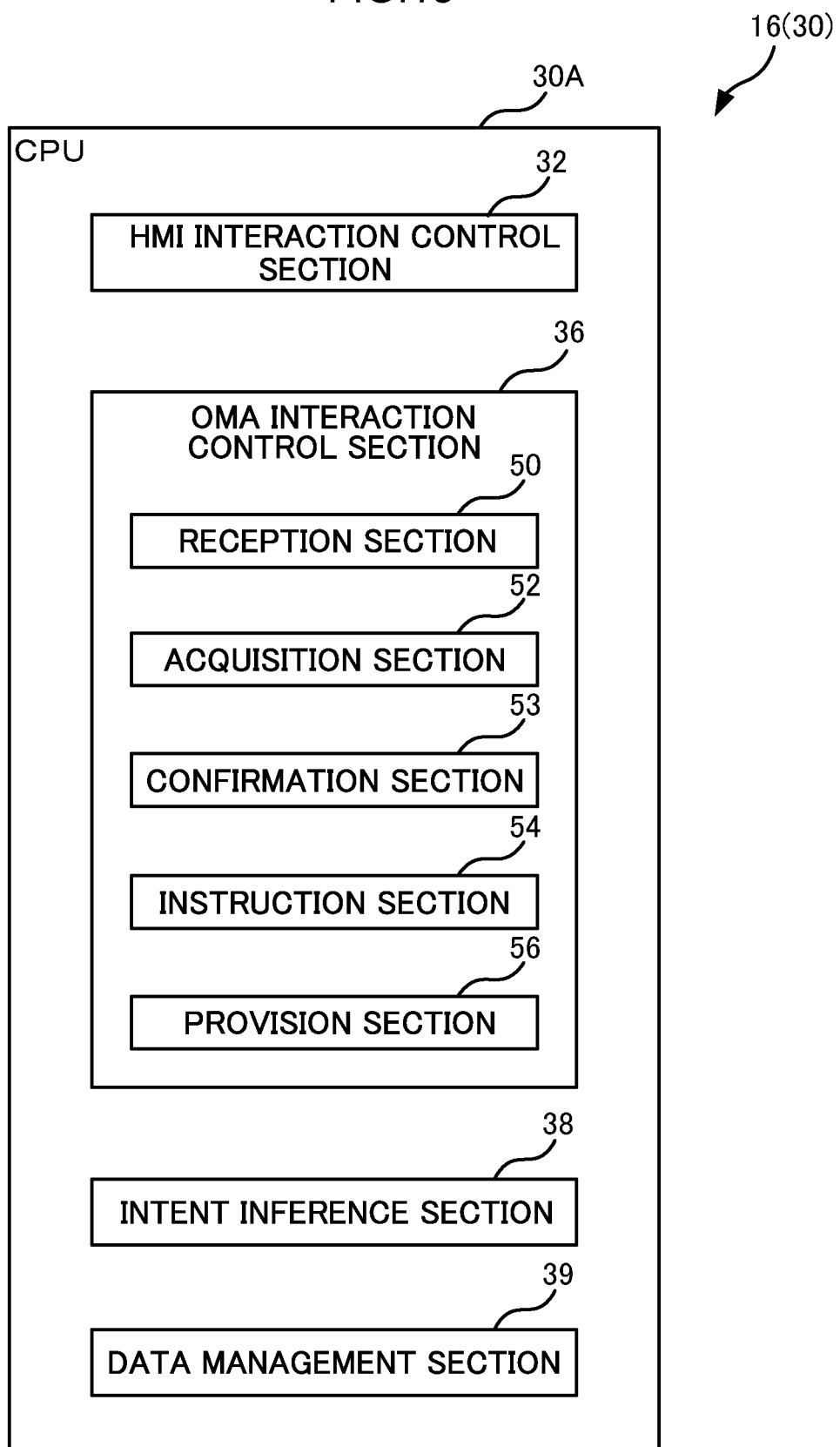
FIG. 15 is a block diagram illustrating an example of functional configuration of an agent server of a third exemplary embodiment.

In the first exemplary embodiment and the second exemplary embodiment, the HMI server 14, the agent server 16, and the data server 19 are configured by different servers 30. By contrast, in a third exemplary embodiment, the HMI server 14 and the data server 19 are consolidated in the agent server 16, as illustrated in FIG. 15.

The manual provision system 10 of the present exemplary embodiment is also capable of obtaining similar advantageous effects to those of the first and second exemplary embodiments.

Remarks

In the exemplary embodiments described above, audio information based on an utterance of an occupant configures the input information of the HMI server 14. However, there is no limitation thereto, and the input information may be configured by operation information based on operation of the touch panel configuring the monitor 28 by the occupant. In such cases, the operation information is, for example, text information relating to a text string input to the monitor 28 by the occupant.

In the third exemplary embodiment described above, the HMI server 14 and the data server 19 included in the manual provision system 10 are consolidated in the agent server 16. However, the OM server 18 may also be consolidated. Alternatively, the servers 30 configuring some out of the HMI server 14, the agent server 16, the OM server 18, and the data server 19 may be consolidated. Moreover, in the agent server 16, the functionality of the OMA interaction control section 36 and the intent inference section 38 may be distributed between different servers 30.

The various processing executed by the CPUs 20A, 30A reading software (a program) in the exemplary embodiments described above may be executed by various types of processor other than the CPUs. Such processors include programmable logic devices (PLDs) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The processing described above may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

The exemplary embodiments described above have described implementations in which the program is in a format pre-stored (installed) in a computer-readable non-transitory recording medium. For example, the processing program 100 of each of the servers 30 is pre-stored in the corresponding storage 30D. However, there is no limitation thereto, and the respective programs may be provided in a format recorded on a non-transitory recording medium such as compact disc read only memory (CD-ROM), digital versatile disc read only memory (DVD-ROM), or universal serial bus (USB) memory. Alternatively, the program may be provided in a format downloadable from an external device through a network.

Instead of being executed by a single processor, the processing of the exemplary embodiments described above may be executed by plural processors working collaboratively. The processing flows explained in the above exemplary embodiment are merely examples, and superfluous steps may be omitted, new steps may be added, or the processing sequences may be changed within a range not departing from the spirit of the present disclosure.

An object of the present disclosure is to provide an agent device, an agent system, and a non-transitory recording medium capable of improving the precision with which intent is inferred by an agent configured to infer the intent of a question.

A first aspect of the disclosure is an agent device that includes: a memory; and a processor coupled to the memory. The processor is configured to: receive state information regarding a state of a vehicle from the vehicle, and receive a question from a user as question information, perform inference processing for the received question information and the received state information in order to infer an intent of the question, and acquire a response to the question based on the inferred intent.

The agent device of the first aspect is capable of acquiring a response obtained to the user's question by inferring the intent of the question. When the question information is received, the agent device receives the state information of the vehicle in addition to the question information, and the inference processing is performed using both the question information and the state information in order to acquire a response to the question based on the inferred intent. This agent device is thus capable of taking the state of the vehicle into account when inferring the intent of the question, enabling the precision with which the intent is inferred to be improved.

A second aspect of the disclosure is the agent device of the first aspect, wherein the processor is configured to perform the inference processing by inputting the received question information and the received state information into a trained model generated by employing past state information relating to a past state of the vehicle prior to a reception timing at which the question information was received, information regarding a plurality of expressions relevant to a question asked by the user at a time at which the past state existed, and correct response information for the plurality of expressions.

The agent device of the second aspect infers the intent using the trained model that has been generated in advance by performing machine learning. This agent device trains for more expressions and more vehicle information, enabling the precision with which the intent of a user's question is inferred to be improved.

A third aspect of the disclosure is the agent device of the second aspect, wherein the state information is acquired based on communication information transmitted along a communication path connecting together a plurality of control devices provided to the vehicle.

In the agent device of the third aspect, the state information of the vehicle can be acquired from the communication path that connects together the plural control devices that control the vehicle. By utilizing this vehicle control communication information, the agent device enables simple acquisition of the state of the vehicle from the vehicle.

A fourth aspect of the disclosure is the agent device of the third aspect, wherein the past state information is acquired based on the communication information, which is transmitted between a predetermined duration prior to the reception timing and the reception timing.

In the agent device of the fourth aspect, the machine learning is performed based on the state of the vehicle during the predetermined duration prior to receiving the question. Setting the predetermined duration to a duration in which, for example, the user will have had a chance to notice a warning lamp or the like enables the agent device to take into account a state of the vehicle of which the occupant is likely to be conscious when inferring the intent.

A fifth aspect of the disclosure is an agent device that includes: a memory; and a processor coupled to the memory. The processor is configured to: receive state information regarding a state of a vehicle from the vehicle, and receive a question from a user as question information, perform intent inference processing on the received question information in order to infer an intent of the question, perform intent identification processing by consulting the state information to identify the intent from among a plurality of the inferred intents, and acquire a response to the question based on the identified intent.

The agent device of the fifth aspect is capable of acquiring a response obtained to the user's question by inferring the intent of the question. When the question information is received, the agent device receives the state information of the vehicle in addition to the question information, and the inference processing is performed based on the question information. The state information of the vehicle is then consulted in order to identify a single intent from out of the plural inferred intents, and the response to the question is acquired based on the single identified intent. This agent device is capable of taking the state of the vehicle into account when inferring the intent of the question, enabling the precision with which the intent is inferred to be improved.

A sixth aspect of the disclosure is the agent device of the fifth aspect, wherein the state information is acquired based on communication information transmitted along a communication path connecting together a plurality of control devices provided to the vehicle.

The agent device of the sixth aspect is capable of acquiring the state information of the vehicle from the communication path that connects together the plural control devices that control the vehicle. By utilizing this vehicle control communication information, the agent device enables simple acquisition of the state of the vehicle from the vehicle.

A seventh aspect of the disclosure is an agent system that includes an agent device and a notification device. The agent device includes a memory and a processor coupled to the memory. The processor is configured to receive state information regarding a state of a vehicle from the vehicle, and receive a question from a user as question information, perform inference processing for the received question information and the received state information in order to infer an intent of the question, and acquire a response to the question based on the inferred intent. The notification device is installed in the vehicle, and the notification device is configured to receive the question from the user and to notify the user of the response.

In the agent system of the seventh aspect, the notification device is installed to the vehicle, and is capable of providing a response to the question from the user, namely an occupant. This agent system is thus capable of enhancing the convenience of operation for the user in the vehicle.

An eighth aspect of the disclosure is the agent system of the seventh aspect, wherein the processor is configured to perform the inference processing by inputting the received question information and the received state information into a trained model generated by employing past state information relating to a past state of the vehicle prior to a reception timing at which the question information was received, information regarding a plurality of expressions relevant to a question asked by the user at a time at which the past state existed, and correct response information for the plurality of expressions.

The agent system of the eighth aspect infers intent using the trained model that has been generated in advance by performing machine learning. This agent system trains for more expressions and more vehicle information, enabling the precision with which the intent of a user's question is inferred to be improved.

A ninth aspect of the disclosure is the agent system of the eighth aspect, wherein the state information is acquired based on communication information transmitted along a communication path connecting together a plurality of control devices provided to the vehicle.

The agent system of the ninth aspect is capable of acquiring the state information of the vehicle from the communication path that connects together the plural control devices that control the vehicle. By utilizing this vehicle control communication information, the agent device enables simple acquisition of the state of the vehicle from the vehicle.

A tenth aspect of the disclosure is the agent system of the ninth aspect, wherein the past state information is acquired based on the communication information, which is transmitted between a predetermined duration prior to the reception timing and the reception timing.

In the agent system of the tenth aspect, the machine learning is performed based on the state of the vehicle during the predetermined duration prior to receiving the question. Setting the predetermined duration to a duration in which, for example, the user will have had a chance to notice a warning lamp or the like enables the agent system to take into account a state of the vehicle of which the occupant is likely to be conscious when inferring the intent.

An eleventh aspect of the disclosure is a non-transitory recording medium storing a program that is executable by a computer to perform processing. The processing includes: receiving state information regarding a state of a vehicle from the vehicle, and receive a question from a user as question information; performing inference processing for the received question information and the received state information in order to infer an intent of the question; and acquiring a response to the question based on the inferred intent.

The non-transitory recording medium of the eleventh aspect enables a computer to execute processing to acquire a response obtained to the user's question by inferring the intent of the question. The computer executing the program receives the state information of the vehicle in addition to the question information, and performs the inference processing using both the question information and the state information in order to acquire a response to the question based on the inferred intent. The program thus enables the state of the vehicle to be taken into account when inferring the intent of the question, enabling the precision with which the intent is inferred to be improved.

A twelfth aspect of the disclosure is the non-transitory recording medium of the eleventh aspect, wherein the inference processing is performed by inputting the received question information and the received state information into a trained model generated by employing past state information relating to a past state of the vehicle prior to a reception timing at which the question information was received, information regarding a plurality of expressions relevant to a question asked by the user at a time at which the past state existed, and correct response information for the plurality of expressions.

The non-transitory recording medium of the twelfth aspect uses the trained model that has been generated in advance by performing machine learning to infer the intent. This non-transitory recording medium thus trains for more expressions and more vehicle information, enabling the precision with which the intent of a user's question is inferred to be improved.

A thirteenth aspect of the disclosure is the non-transitory recording medium of the twelfth aspect, wherein the state information is acquired based on communication information transmitted along a communication path connecting together a plurality of control devices provided to the vehicle.

The non-transitory recording medium of the thirteenth aspect is capable of acquiring the state information of the vehicle from the communication path that connects together the plural control devices that control the vehicle. By utilizing this vehicle control communication information, the non-transitory recording medium enables simple acquisition of the state of the vehicle from the vehicle.

A fourteenth aspect of the disclosure is the non-transitory recording medium of the thirteenth aspect, wherein the past state information is acquired based on the communication information, which is transmitted between a predetermined duration prior to the reception timing and the reception timing.

In the non-transitory recording medium of the fourteenth aspect the machine learning is performed based on the state of the vehicle during the predetermined duration prior to receiving the question. Setting the predetermined duration to a duration in which, for example, the user will have had a chance to notice a warning lamp or the like enables the non-transitory recording medium to take into account a state of the vehicle of which the occupant is likely to be conscious when inferring the intent.

The present disclosure is capable of improving the precision with which intent is inferred by an agent configured to infer the intent of a question.

What is claimed is:

1. An agent device comprising:
a memory; and
a processor coupled to the memory, the processor being configured to:
receive state information regarding a state of a vehicle from the vehicle, and receive a question from a user as question information,
perform inference processing for the received question information and the received state information in order to infer an intent of the question, and
acquire a response to the question based on the inferred intent,
wherein the processor is configured to perform the inference processing by inputting the received question information and the received state information into a trained model generated by employing past state information relating to a past state of the vehicle prior to a reception timing at which the question information was received, information regarding a plurality of expressions relevant to a question asked by the user at a time at which the past state existed, and correct response information for the plurality of expressions,
wherein the trained model is data generated by performing machine learning employing training data based on past states of the vehicle prior to a reception timing when the processor received text information, and on past occupant questions, and
wherein input of the training data is the past state information of the vehicle, and text information relating to plural expressions relevant to questions during these past states, and an intent label relating to a correct response to each of the questions is output.

2. The agent device of claim 1, wherein the state information is acquired based on communication information transmitted along a communication path connecting together a plurality of control devices provided to the vehicle.

3. The agent device of claim 2, wherein the past state information is acquired based on the communication information, which is transmitted between a predetermined duration prior to the reception timing and the reception timing.

4. An agent device comprising:
a memory; and
a processor coupled to the memory, the processor being configured to:
receive state information regarding a state of a vehicle from the vehicle, and receive a question from a user as question information,
perform intent inference processing on the received question information in order to infer an intent of the question,
perform intent identification processing by consulting the state information to identify the intent from among a plurality of the inferred intents, and
acquire a response to the question based on the identified intent,
wherein the processor is configured to perform the inference processing by inputting the received question information and the received state information into a trained model generated by employing past state information relating to a past state of the vehicle prior to a reception timing at which the question information was received, information regarding a plurality of expressions relevant to a question asked by the user at a time at which the past state existed, and correct response information for the plurality of expressions,
wherein the trained model is data generated by performing machine learning employing training data based on past states of the vehicle prior to a reception timing when the processor received text information, and on past occupant questions, and
wherein input of the training data is the past state information of the vehicle, and text information relating to plural expressions relevant to questions during these past states, and an intent label relating to a correct response to each of the questions is output.

5. The agent device of claim 4, wherein the state information is acquired based on communication information transmitted along a communication path connecting together a plurality of control devices provided to the vehicle.

6. An agent system comprising:
an agent device that includes a memory and a processor coupled to the memory, the processor being configured to
receive state information regarding a state of a vehicle from the vehicle, and receive a question from a user as question information,
perform inference processing for the received question information and the received state information in order to infer an intent of the question, and
acquire a response to the question based on the inferred intent, and
a notification device that is installed in the vehicle, and that is configured to receive the question from the user and to notify the user of the response,
wherein the processor is configured to perform the inference processing by inputting the received question information and the received state information into a trained model generated by employing past state information relating to a past state of the vehicle prior to a reception timing at which the question information was received, information regarding a plurality of expressions relevant to a question asked by the user at a time at which the past state existed, and correct response information for the plurality of expressions, wherein the trained model is data generated by performing machine learning employing training data based on past states of the vehicle prior to a reception timing when the processor received text information, and on past occupant questions, and wherein input of the training data is the past state information of the vehicle, and text information relating to plural expressions relevant to questions during these past states, and an intent label relating to a correct response to each of the questions is output.

7. The agent system of claim 6, wherein the state information is acquired based on communication information transmitted along a communication path connecting together a plurality of control devices provided to the vehicle.

8. The agent system of claim 7, wherein the past state information is acquired based on the communication information, which is transmitted between a predetermined duration prior to the reception timing and the reception timing.

9. A non-transitory recording medium storing a program executable by a computer to perform processing, the processing comprising:

receiving state information regarding a state of a vehicle from the vehicle, and receive a question from a user as question information;

performing inference processing for the received question information and the received state information in order to infer an intent of the question; and acquiring a response to the question based on the inferred intent, wherein the inference processing is performed by inputting the received question information and the received state information into a trained model generated by employing past state information relating to a past state of the vehicle prior to a reception timing at which the question information was received, information regarding a plurality of expressions relevant to a question asked by the user at a time at which the past state existed, and correct response information for the plurality of expressions, wherein the trained model is data generated by performing machine learning employing training data based on past states of the vehicle prior to a reception timing when the computer received text information, and on past occupant questions, and wherein input of the training data is the past state information of the vehicle, and text information relating to plural expressions relevant to questions during these past states, and an intent label relating to a correct response to each of the questions is output.

10. The non-transitory recording medium of claim 9, wherein the state information is acquired based on communication information transmitted along a communication path connecting together a plurality of control devices provided to the vehicle.

11. The non-transitory recording medium of claim 10, wherein the past state information is acquired based on the communication information, which is transmitted between a predetermined duration prior to the reception timing and the reception timing.

* * * * *